United States Patent [19]

Spiegelman

[11] Patent Number: 5,088,774
[45] Date of Patent: Feb. 18, 1992

[54] COUPLING FOR INTERCONNECTION OF COAXIAL TUBING

[75] Inventor: Jeffrey J. Spiegelman, San Diego, Calif.

[73] Assignee: Tylan General, Inc., San Diego, Calif.

[21] Appl. No.: 519,874

[22] Filed: May 7, 1990

[51] Int. Cl.⁵ ............................................. F16L 39/00
[52] U.S. Cl. ................................ 285/133.1; 285/332; 285/384; 285/917
[58] Field of Search ...................... 285/133.1, 917, 906, 285/353, 354, 393, 384, 332

[56] References Cited

U.S. PATENT DOCUMENTS

| | | |
|---|---|---|
| 724,675 | 4/1906 | Decker . |
| 1,812,471 | 6/1931 | Cater . |
| 2,054,859 | 9/1936 | Kitching ............................. 285/22 |
| 2,341,629 | 2/1944 | Kreidel ........................... 285/332 X |
| 2,475,635 | 7/1949 | Parsons ...................... 285/133.1 X |
| 4,108,476 | 8/1978 | Krupp ........................ 285/133.1 X |
| 4,121,858 | 10/1978 | Schulz ........................ 285/133.1 X |
| 4,732,414 | 3/1988 | Inaba ............................ 285/133.1 |
| 4,838,583 | 6/1989 | Babuder et al. ................. 285/379 X |
| 4,854,597 | 8/1989 | Leigh ............................ 285/328 X |
| 4,886,305 | 12/1989 | Martin ........................... 285/179 X |

FOREIGN PATENT DOCUMENTS 461269 2/1975 U.S.S.R. .
0734471 5/1980 U.S.S.R. .............................. 285/353
2034839 6/1980 United Kingdom .

OTHER PUBLICATIONS

Cajon ® Vacuum Products, Catalog No. CA-877A, Cajon Company, Macedonia, Ohio.

Primary Examiner—Peter M. Cuomo
Assistant Examiner—Heather Chun
Attorney, Agent, or Firm—Knobbe, Martens, Olson & Bear

[57] ABSTRACT

A interconnection system for coaxial fluid tubing includes zero-clearance connectors having a metallic innner gasket for sealing an inner passageway for a first fluid and having a elastomeric outer gasket for sealing an outer passageway for a second fluid. The elastomeric outer gasket forms a fluid-tight seal as the connectors are tightened. Further tightening of the connectors engages and seals the metallic inner gasket. Both straight tubing sections and elbows are constructed in a factory setting so that the completed sections can be assembled at a job site without cutting or welding.

13 Claims, 6 Drawing Sheets

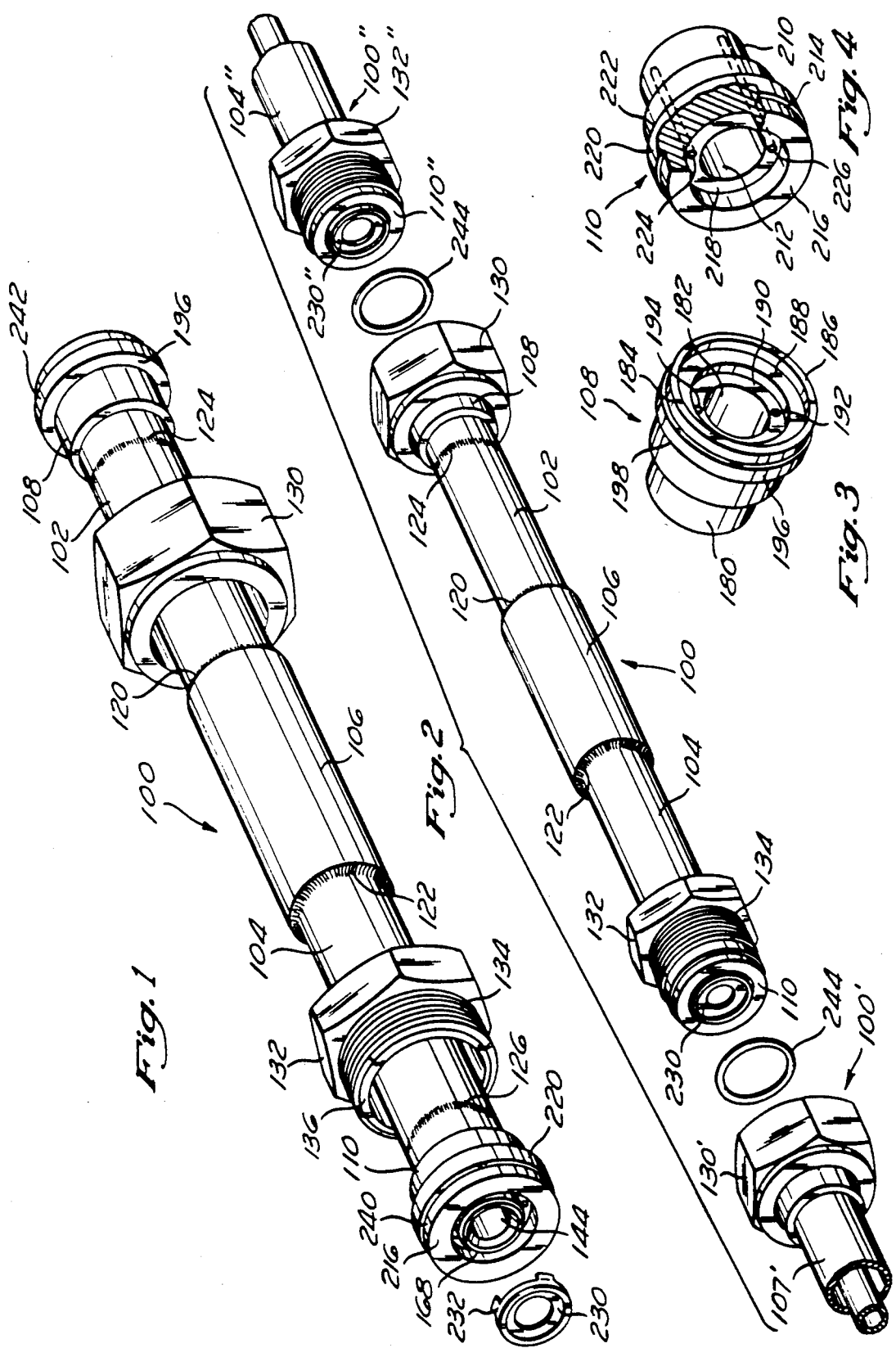

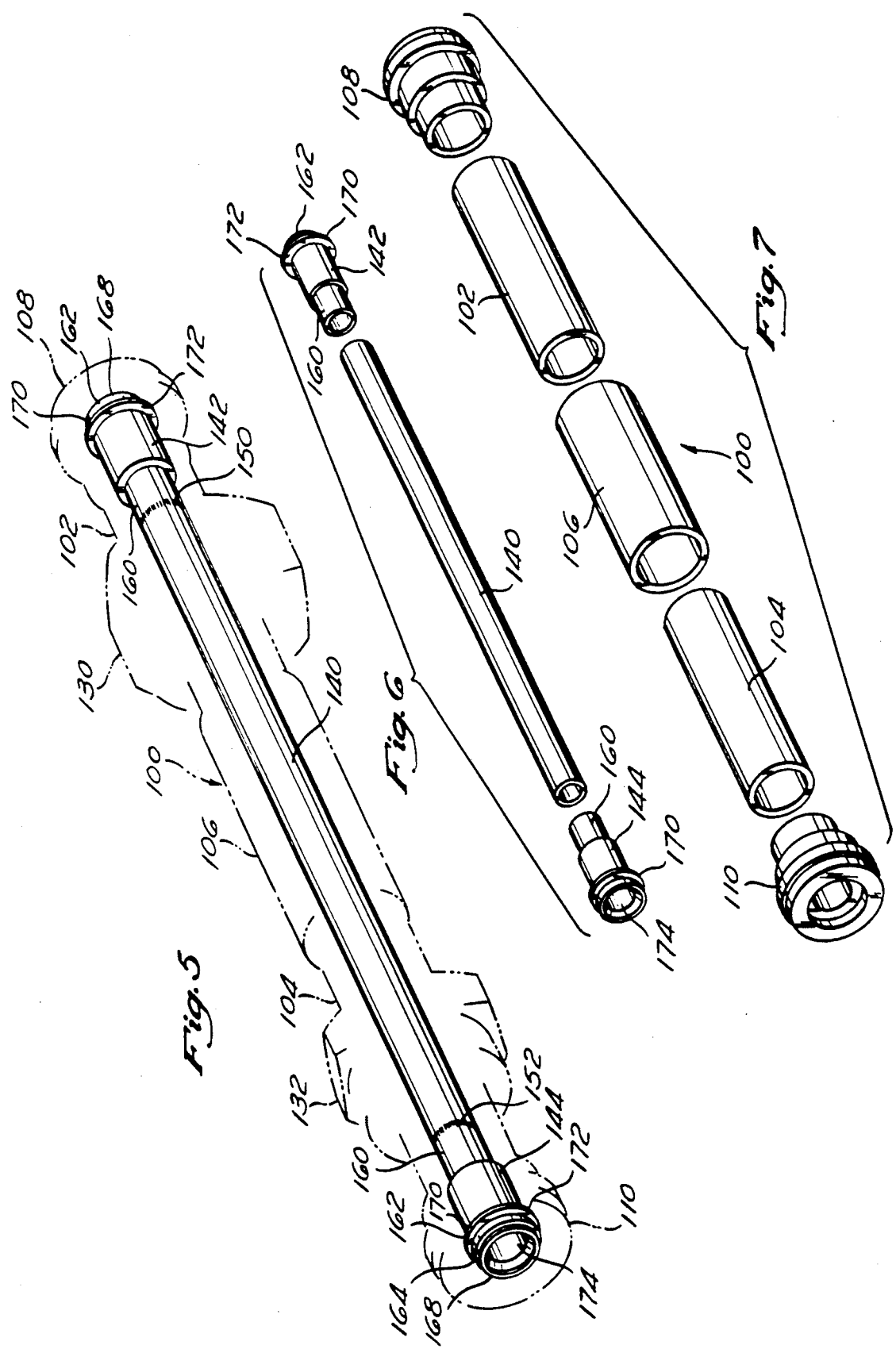

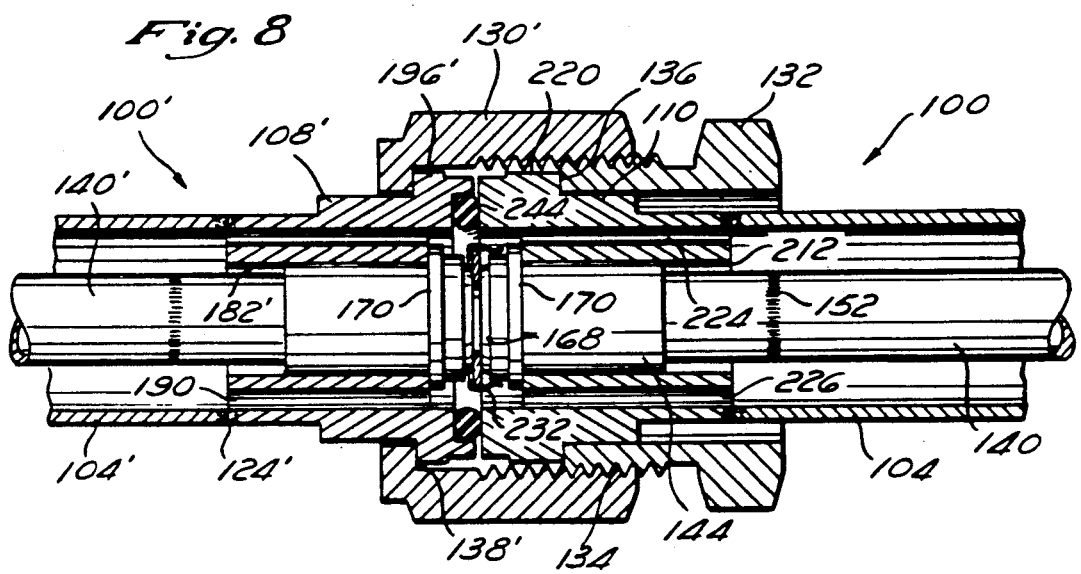
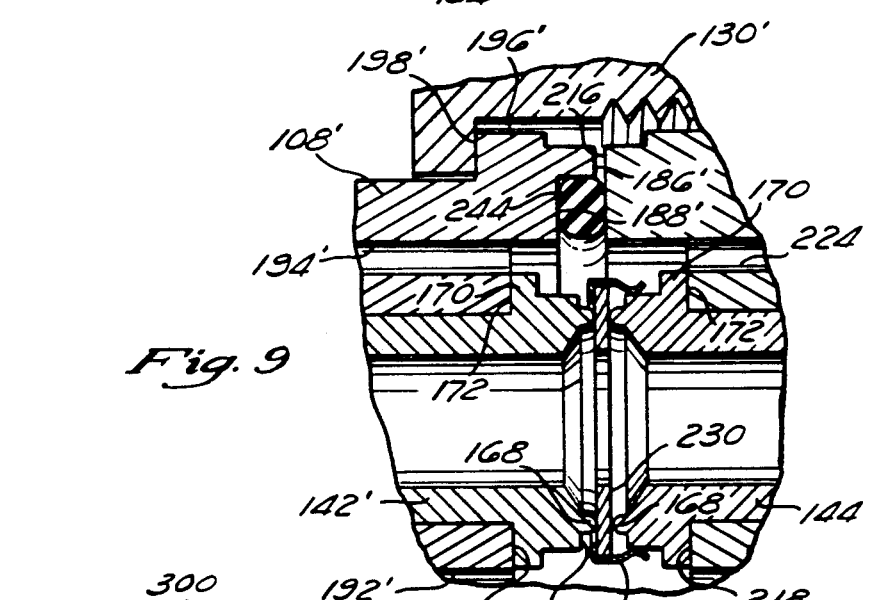
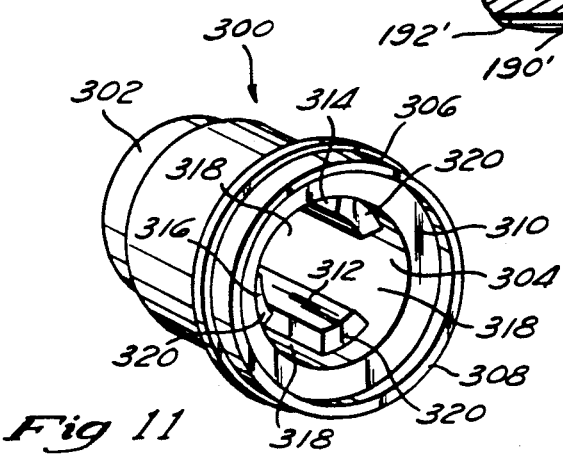

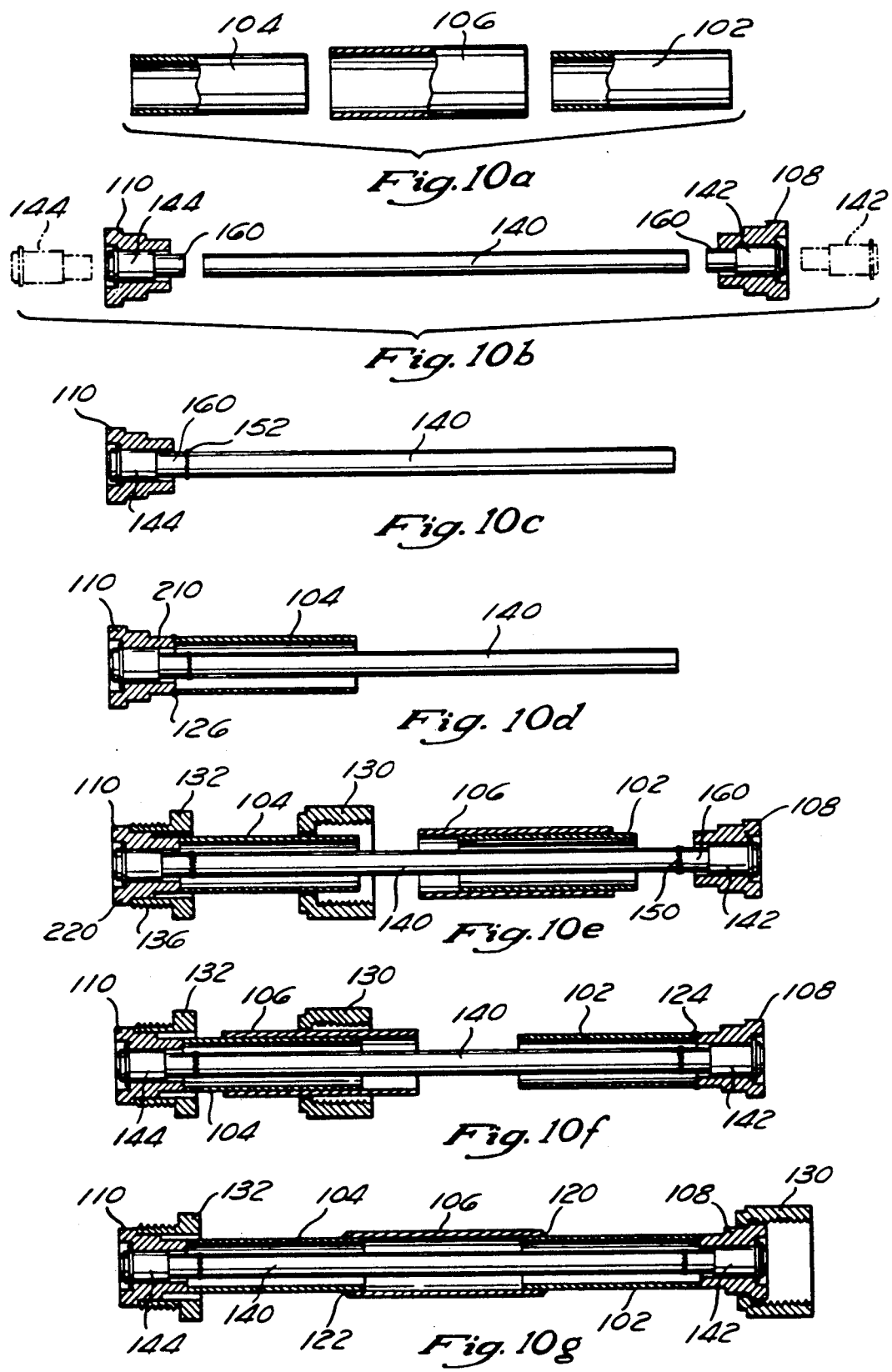

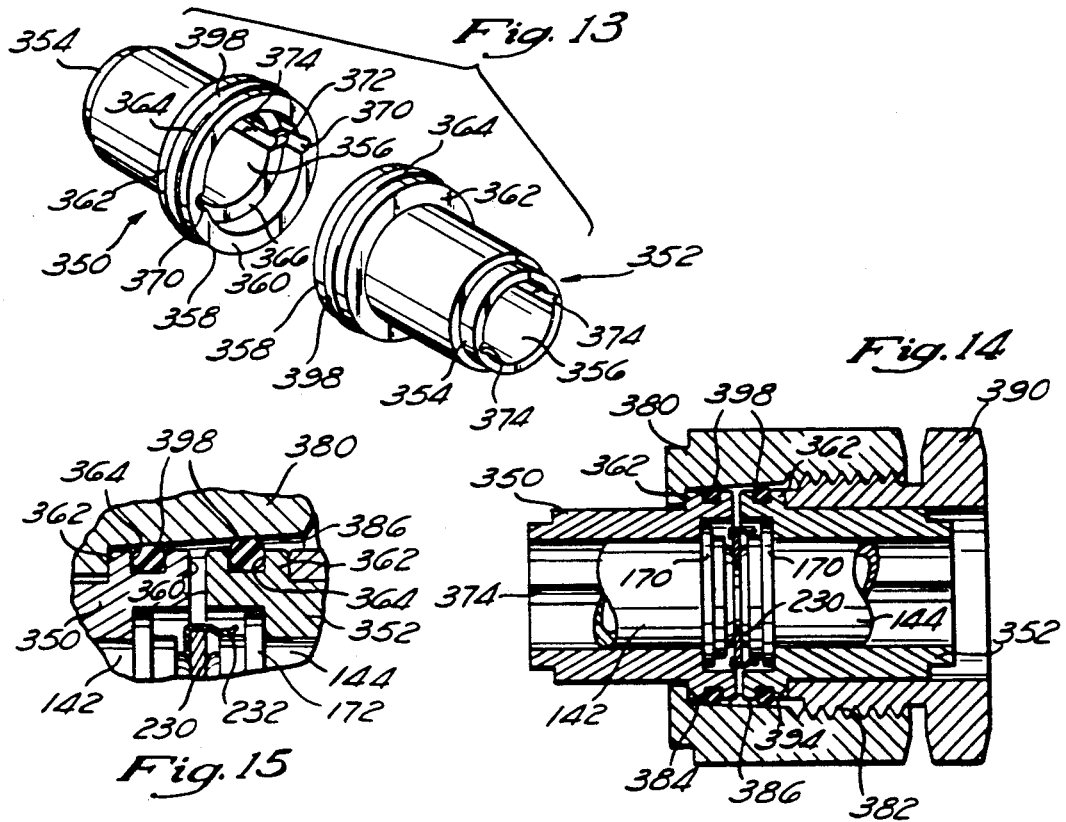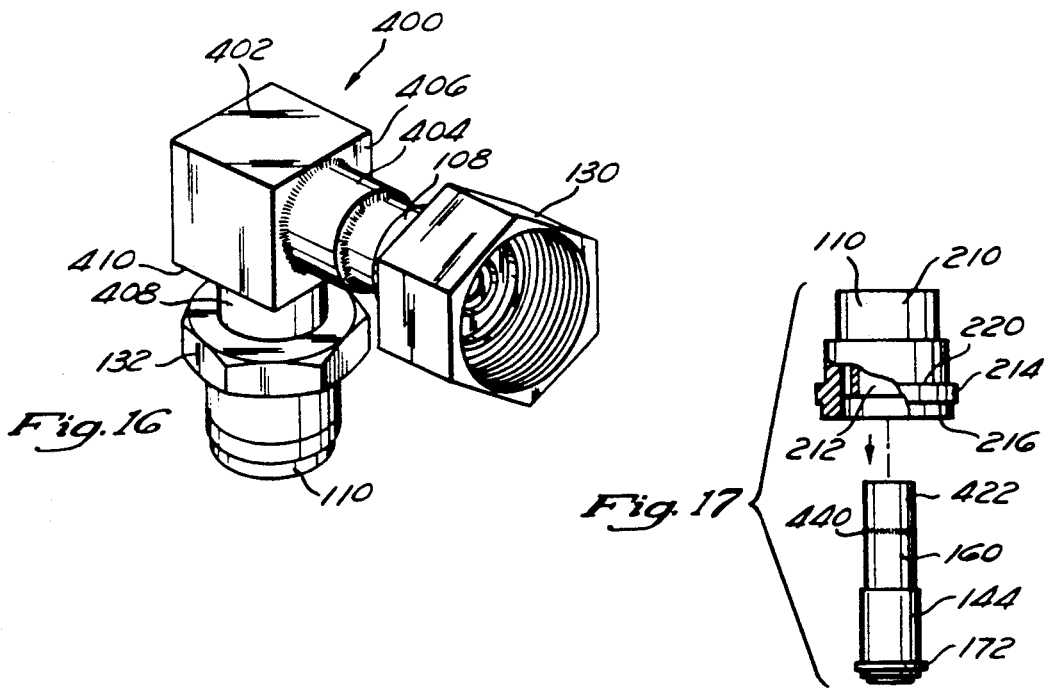

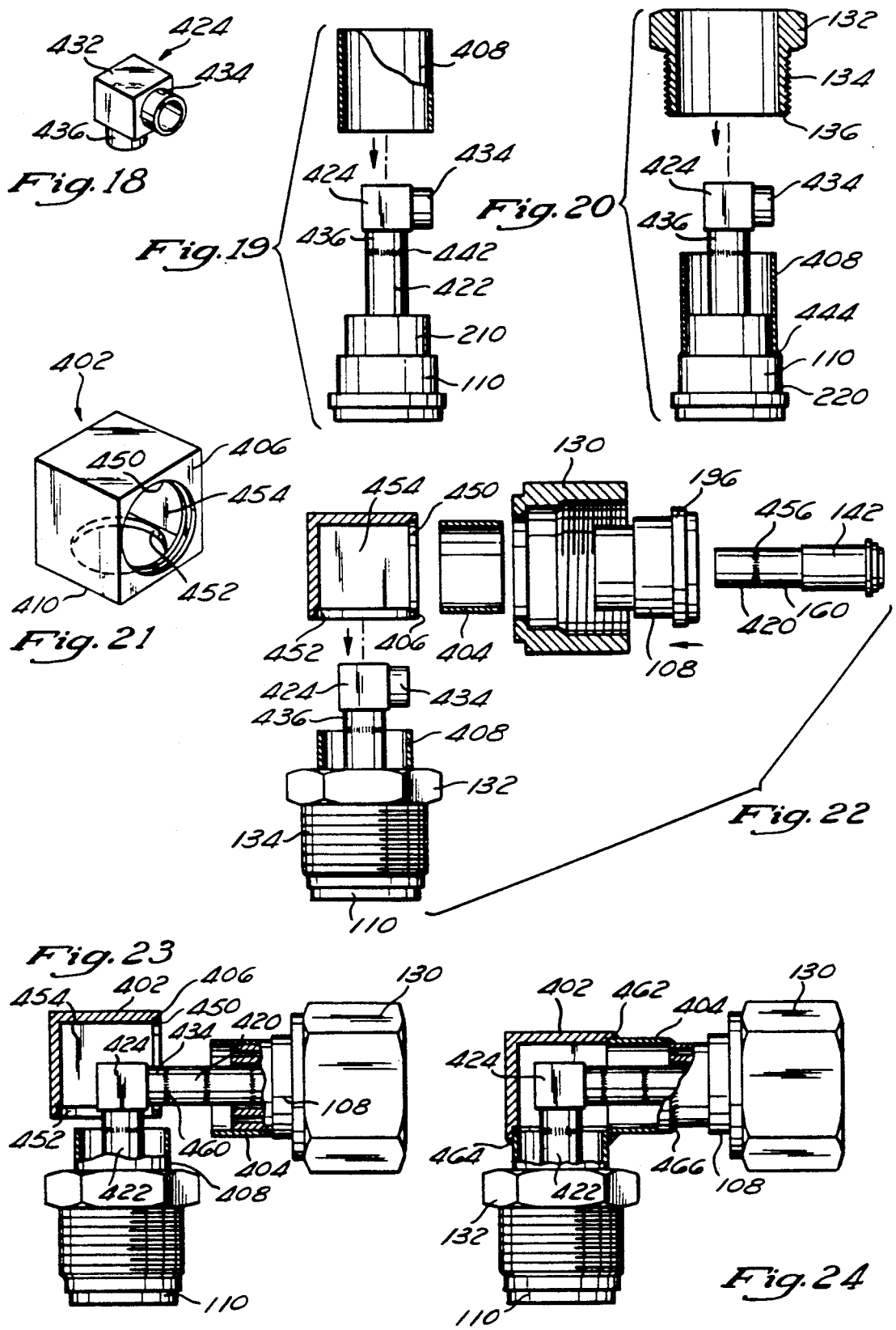

COUPLING FOR INTERCONNECTION OF COAXIAL TUBING

FIELD OF THE INVENTION

The invention generally relates to couplings, and, in particular, to couplings used for the interconnection of coaxial tubing.

BACKGROUND OF THE INVENTION

Coaxial tubing is commonly used to provide flow for two fluids (i.e., gases or fluids) and typically comprises an inner tube supported between the walls of an outer tube. For example, such tubing is often utilized to carry toxic or hazardous gases used in connection with semiconductor manufacturing wherein the inner tube carries the toxic gas and an air space formed between the two parallel tubes carries an uninterrupted flow of purge gas. Should a leak occur in the inner tube, the released toxic or hazardous gas will mix with the purge gas in the annular space between the inner and outer tubes and thus be prevented from escaping into the ambient atmosphere. Alternatively, the purge gas is at a higher pressure than the toxic gas so that the purge gas blocks the release of the toxic gas from the inner tube. A leak is detected as a drop in the pressure of the purge gas. In addition, the outer tube serves to protect the inner tube from contact with objects which may accidentally breach the inner tube and allow the gas carried therein to leak into the surrounding air.

The tubing is typically provided in lengths which are cut to fit a particular installation. In addition, certain fittings are provided including elbows, tees, couplers, and the like, to interconnect the various lengths of tubing. Commonly, the coaxial tubing is connected by first welding the inner tubing to a fitting and then welding the outer tube to the fitting, using a sliding sleeve, for example To assemble the individual lengths into a unified structure, each weld must be performed separately. The process is thus very time consuming. Furthermore, the process is difficult to automate, particularly when it must be performed at an installation site for a unique configuration. This is a particular disadvantage since the installation sites are typically clean rooms, or the like, where the residue from cutting and welding is undesirable.

Couplings have been developed which can be partially assembled beforehand, leaving relatively simple connections to be made at the installation site. One such coupling is disclosed in U.S. Pat. No. 4,732,414 entitled "Joint for Coaxial Pipe" wherein the coupling comprises a male and female joint portion. The end surfaces of the joint portions have opposed protrusions which engage a common metallic packing. However, such a design is disadvantageous as the common packing provides only a single sealing surface between the inner and outer tubes in the pipe and, thus, accurate alignment of the packing is difficult to obtain. In addition, this design requires precise parallel formation of the protrusions on the male and female joint portions for both the inner seal and the outer seal in order to engage the packing, resulting in increased manufacturing time and expense.

Soviet Union Patent 461,269 discloses a twin bore pipe coupling including a nipple welded to one pipe and a union welded to the other in a coaxial pipe. When a nut is screwed onto the union, a sealing insert is trapped and the sealing of the external and internal bore is complete. This type of coupling is disadvantageous because the rotational forces applied to screw the nut onto the union exert similar rotational forces on the sealing insert which could damage the insert. The coupling is not applicable to high pressure applications because the seal created between the external and internal bore is not leak-tight Furthermore, the coupling is not a zero-clearance fitting, so that if the coupling breaks or is damaged, the entire pipe section must be disconnected and disassembled.

UK Patent Application 2,034,839 entitled "A coupling element and pipe coupling for use with jacketed pipes" also discloses a coupling for use with coaxial tubing. The coupling includes first and second coupling elements which are drawn together using an internally threaded connecting nut. Two elastomeric sealing rings are compressed between the two coupling elements to ensure fluid-tight connections. The sealing rings cannot however, be used with corrosive gases because the gas will act to deteriorate the elastomeric seals resulting in leaks between the coupling elements.

SUMMARY OF THE INVENTION

The present invention provides a coupling for use with coaxial gas tubing which allows the interconnection of two coaxial pipes to be performed in one simple operation. The coupling comprises a first inner fitting welded to a first length of inner tubing in a first coaxial pipe. The first inner fitting includes a circular ridge having a metallic gasket or seal disposed thereon. The first coaxial pipe includes a first length of outer tubing which encloses the first length of inner tubing. A first outer fitting is positioned over the first inner fitting and welded to the first length of outer tubing. The first outer fitting includes a first end portion and a second end portion wherein the second end portion includes a facing surface. A shoulder is formed intermediate the first and second end portions. A male coupler having a plurality of external threads is positioned so as to contact the shoulder on the first outer fitting. Cylindrical bores are formed in an annular recess to provide fluid interconnections between the first and second end portions.

A second inner fitting identical to the first inner fitting and having a circular ridge is welded to a second length of inner tubing in a second coaxial pipe The second coaxial pipe further comprises a second length of outer tubing which encloses the second length of inner tubing. A second outer fitting is positioned over the second inner fitting and welded to the second length of outer tubing. The second outer fitting includes first and second end portions. The second end portion includes a flush facing surface and a recessed facing surface. The recessed facing surface has an elastomeric seal disposed thereon. The second outer fitting further includes a shoulder formed intermediate the first and second end portions. A female coupler having a plurality of internal threads is positioned so as to contact the shoulder on the second outer fitting. Cylindrical bores formed in an annular recess provide fluid interconnections between the first and second end portions.

Interconnection of the tubing is accomplished by threading the male and female couplers together in a conventional manner. As the couplers are threaded, the first and second outer fittings are forced together, compressing the elastomeric seal between the facing surface on the first outer coupler and the recessed facing surface on the second outer coupler. At the same time, the inner fittings are forced together, forcing the metallic gasket into contact with the circular ridges formed on the inner fittings.

The welds between the fittings and tubing lengths can all be performed in advance of installation in a factory setting. In this manner, inner and outer tubing seals are accomplished in one simple operation by threading the male and female couplers together at the installation site.

The first inner fitting and the first outer fitting are advantageously constructed as a single unit. Similarly, the second inner fitting and the second outer fitting are advantageously constructed as a single unit.

An alternative outer fitting is also disclosed wherein the first outer fitting comprises a first end portion having an inner bore and a second end portion. The second end portion includes a facing surface and a recessed facing surface surrounding the inner bore. A plurality of raised bars are formed on the inside wall of the recessed facing surface to form channels within the inner bore. The channels allow more flow through the outside tubing when the outer fittings are welded to the outer tubing lengths.

Another alternative embodiment is disclosed wherein the first and second outer fittings are of identical construction. Each fitting comprises a first end portion having an inner bore and a second end portion including a facing surface. A shoulder is formed intermediate the first and second end portions and an annular groove is formed intermediate the shoulder and the facing surface. Radial and longitudinal grooves are formed in the outer fitting to provide fluid interconnections between the first and second end portions. An elastomeric seal is positioned in the annular groove on each outer fitting. A male coupler is positioned on the first outer fitting and a female coupler is positioned on the second outer fitting. The female coupler comprises a plurality of internal threads formed in a cavity having a tapered wall. When the male and female coupler are joined together, the elastomeric seals are compressed between the outer fitting and the tapered wall, thus sealing the outer flow passageways.

The present invention further provides a right-angle coupling wherein a right-angle fitting is welded to a first and second length of inner tubing. An inner fitting is welded to each end of the inner tubing, opposite the right angle fitting. First and second outer fittings are positioned over the inner fittings and welded to first and second lengths of outer tubing. In addition, each length of outer tubing is welded to perpendicular faces on a rectangular sleeve. A female coupler is positioned over the second outer fitting and a male coupler is positioned over the first outer fitting. Connections between sections of coaxial tubing can be easily made by engaging the couplers with sections of tubing having couplers of the opposite threading.

BRIEF DESCRIPTION OF THE DRAWINGS

FIG. 1 is a perspective view of a section of coaxial tubing constructed in accordance with the present invention;

FIG. 2 is a perspective view of the section of coaxial tubing of FIG. 1 and partial perspective views of two additional sections to be interconnected thereto;

FIG. 3 is a perspective view of the first outer fitting of the coaxial tubing section of FIG. 1;

FIG. 4 is a perspective view of the second outer fitting of the coaxial tubing section of FIG. 1;

FIG. 5 is a perspective view illustrating the details of the inner tubing enclosed within the outer tubing section of FIG. 1 (shown in phantom);

FIG. 6 is an exploded view of the inner tubing shown in FIG. 5 prior to welding the components together;

FIG. 7 is an exploded perspective view illustrating the outer tubing and the outer fittings prior to assembly;

FIG. 8 is a cross-section illustrating the interconnection of a male and female fitting in accordance with the present invention;

FIG. 9 is an enlarged cross-sectional view of the metallic and elastomeric seals shown in FIG. 8;

FIG. 10a through FIG. 10g are cross-sectional illustrations of the steps in the assembly of a section of coaxial tubing in accordance with the present invention;

FIG. 11 is a perspective view of an alternative embodiment of the outer fitting having enlarged pathways for the flow of purge gases;

FIG. 12 is a cross-sectional view of the outer fitting of FIG. 11;

FIG. 13 illustrates a further alternative embodiment of the outer fittings having annular rings for elastomeric seals;

FIG. 14 is a cross-sectional view that illustrates the interconnection of two sections of coaxial tubing using the outer fittings of FIG. 13 showing a female coupler having a tapered inner surface for compressing the elastomeric seals;

FIG. 15 is an enlarged cross-sectional view of the elastomeric seals shown in FIG. 14;

FIG. 16 is a perspective view of a right-angle fitting in accordance with the present invention;

FIG. 17 through FIG. 24 illustrate the steps in the assembly process for the right-angle fitting of FIG. 16.

DETAILED DESCRIPTION OF THE INVENTION

FIG. through FIG. 7 illustrate a section of coaxial tubing 100 assembled in accordance with the present invention. The section 100 comprises a first length of outer tubing 102, a second length of outer tubing 104, a sleeve 106, a first outer fitting 108, and a second outer fitting 110, best illustrated in the pre-assembled view of FIG. 7. As shown in FIG. 1, each length of outer tubing 102, 104 is welded to the sleeve 106 at respective locations 120 and 122 such that the sleeve is positioned intermediate the lengths of outer tubing. The diameter of the sleeve 106 is selected to be only slightly larger than the diameter of the outer tubing lengths 102, 104 such that the ends of the outer tubing lengths are partially enclosed by the sleeve when the outer tubing lengths 102, 104 are welded to the sleeve 106, thus minimizing the risk of leaks within the outer tubing passage. In addition, the first outer fitting 108 is butt welded to the first length of outer tubing 102 opposite the sleeve 106 at a location 124 and the second outer fitting 110 is butt welded to the second length of outer tubing 104 opposite the sleeve 106 at a location 126. The diameter of each outer fitting 108, 110 is substantially equal to that of the outer tubing lengths 102, 104, so that a continuous outer passage is formed once the outer fittings are welded to the outer tubing lengths.

The coaxial tubing 100 further includes a female coupler 130 slidably mounted on the first length of the outer tubing 102 and a male coupler 132 slidably mounted on the second length of outer tubing 104. The male coupler 132 includes a plurality of external threads 134 and a facing surface 136. The female coupler 130 comprises a plurality of internal threads (now shown) and an inside facing surface 138 shown in FIG. 8. The male and female couplers 130, 132 advantageously comprise VCR ® male and female nuts available from Cajon Company of Macedonia, Ohio.

A length of inner tubing 140, best shown in FIG. 5 and FIG. 6, is enclosed within the outer tubing lengths 102, 104 and sleeve 106. A pair of identical inner fittings 142, 144 are butt welded to the ends of the inner tubing 140 at locations 150 and 152, respectively, so as to create a continuous fluid passage. Each inner fitting 142, 144 comprises a first end portion 160 with a diameter substantially equal to the diameter of the inner tubing length 140. A second end portion 162 is located opposite the first end portion 160 and includes a facing surface 164 having a raised circular ridge 168 formed thereon. A shoulder portion 170 is disposed proximate to the second end portion 162, intermediate the first and second end portions 160, 162. The shoulder portion 170 includes a facing surface 172 disposed toward the first end portion 160 and has a diameter greater than the outside diameter of the first end portion 160. The raised circular ridge 168 surrounds a center bore 174 that permits the passage of a gas therethrough. The inner fittings 142, 144 advantageously comprise VCR ® Male Weld Glands available from Cajon Company.

The first outer fitting 108 is illustrated in more detail in FIG. 3. The first outer fitting 108 comprises a first end portion 180 having an inner bore 182. A second end portion 184 is located opposite the first end portion 180 and includes a facing surface 186. The second end portion 184 further comprises a recessed facing surface 188. An annular recess 190 is formed within the recessed facing surface 188 and surrounds the inner bore 182. The annular recess 190 includes two cylindrical bores 192, 194 formed therein providing fluid interconnections between the first and second end portions 180, 184. The first outer fitting 108 also comprises a shoulder 196 disposed proximate to the facing surface 186 of the second end portion 184. The shoulder 196 forms a facing surface 198 which faces in the opposite direction from the facing surface 186.

FIG. 4 shows the second outer fitting 110 in more detail. The second outer fitting 110 is constructed similar to the first outer fitting 108 and comprises a first end portion 210 having an inner bore 212. A second end portion 214 is disposed opposite the first end portion 210 and has a facing surface 216. An annular recess 218 is formed within the facing surface 216 and surrounds the inner bore 212. A shoulder 220 is disposed intermediate the first and second end portions 210, 214. The shoulder 220 forms a facing surface 222 that faces opposite the facing surface 216. Two cylindrical bores 224, 226 are formed in the annular recess 218 to provide fluid flow passages interconnecting the first and second end portions 210, 214 of the fitting 110.

Although the preferred embodiment is illustrated as comprising custom-designed first and second outer fittings positioned over commercially available first and second inner fittings, those skilled in the art will recognize that each pair of first and second outer fittings can be constructed as a single unit in alternative embodiments. For example, the center bore 174, the circular ridge 168, the facing surfaces 186, 188, the cylindrical bores 192, 194, and the annular recess 190 of the first inner fitting 142 and the first outer fitting 108 can be milled from a solid cylindrical rod. Similarly, the center bore 174, the circular ridge 168, the facing surface 216, the cylindrical bores 224, 226, and the annular recess 218 of the second inner fitting 144 and the second outer fitting 110 can be milled from a second solid cylindrical rod.

When assembled, as best illustrated in FIG. 1, the second inner fitting 144 is disposed within the inner bore 212 of the second outer fitting 110 such that the facing surface 172 of the shoulder portion 170 of the second inner fitting is in contact with the annular recess 218 in the second outer fitting 110. Similarly, the first inner fitting 142 is positioned within the inner bore 182 of the first outer fitting 108 as shown in FIG. 10e. A metallic gasket or seal 230 is positioned over the raised circular ridge 168 on the second inner fitting 144 and held in place with a circular retaining clip 232 positioned over the ridge 168. Such a metallic gasket 230 and retaining clip 232 are available from Cajon Company as a VCR ® Gasket and VCR ® Gasket Retainer.

FIG. 2 illustrates the first coaxial tubing section 100 connected intermediate a second coaxial tubing section 100' and a third coaxial tubing section 100". The second and third sections 100' and 100" are advantageously constructed in a similar manner to the first coaxial tubing section 100; however, only one end of each section 100' and 100" is shown in FIG. 2. In the preferred embodiment, the sections 100' and 100" are identical to the tubing section 100 and have identical parts numbered with a prime (') and a double-prime ("), respectively.

The male coupler 132 is positioned on a first end 240 of the first section 100 and the female coupler 130 is positioned on a second end 242 of the first section 100 such that the couplers 130, 132 cover the outer fittings 108, 110. The facing surfaces 136, 138 of the couplers 130, 132 abut the ends of the outer fittings 108, 110. An elastomeric seal 244 is positioned on the recessed facing surface 188 (FIG. 3) of the first outer fitting 108. The first section 100 is connected at the first end 240 to the second section of tubing 100' and connected at the second end 242 to the third section of tubing 100". The male coupler 132 of the first section 100 is engaged with the female coupler 130' of the second section 100" and the female coupler 130 of the first section 100 is engaged with the male coupler 132" of the third section 100" in a conventional manner to connect the three sections of tubing 100, 100', 100".

The interconnection of the present invention is illustrated in more detail in cross section in FIG. 8 and FIG. 9. The first and second sections of coaxial tubing 100, 100' are connected with the metallic gasket 230 and the elastomeric seal 244 disposed therebetween and held in place proximate to the circular ridges of the inner fittings 144, 142' by the retainer ring 232. The elastomeric or pliable seal 244 is positioned on the recessed facing surface 188' of the first outer fitting 108'.

The male coupler 132 of the first coaxial tubing section 100 is threadedly engaged with the female coupler 130' of the second coaxial tubing section 100', forcing the first and second outer fittings 108', 110 together. As the outer fittings 108', 110 are forced together, the elastomeric seal 244 is compressed between the facing surfaces 188', 216 of the outer fittings 108', 110 to form a fluid-tight seal between the first and second outer fittings 108', 110. Further movement of the outer fittings 108', 110 relative to one another forces the metallic gasket 230 to contact the circular ridges 168 of the inner fittings 144, 142' and causes further compression of the elastomeric seal 244 between the facing surfaces 188', 216. The circular ridges 168 crush the metallic gasket 230 to form a fluid-tight contact between the circular ridges 168, thereby forming a seal between the inner fittings 144, 142'. The compression of the elastomeric seal 244 before the engagement of the metallic gasket 230 with the circular ridges 168 assures that a fluid-tight seal is provided between the outer fittings 108', 110 before movement is limited by the metallic gasket 230. Thus, the inner and outer tubing seals and connections are accomplished in one simple operation by simply threading the male and female couplers 130', 132 on the tubing sections 100, 100'.

FIGS. 10a through 10g illustrate the assembly process for the first coaxial tubing section 100 in accordance with the present invention. FIGS. 10a and 10b show the individual components of the assembly as discussed above. In the first step of the assembly, shown in FIG. 10b, the first and second inner fittings 142, 144 are positioned within the first and second outer fittings 108, 110, respectively. The end portions 160 of the inner fittings 142, 144 are disposed within the inner bores 182, 212 of the outer fittings 108, 110, and partially extend outward beyond the end portions 180 and 210, respectively. The facing surfaces 172 of the shoulder portions 170 of the inner fittings 142, 144 are in contact with the annular recesses 190, 218 of the outer fittings 108, 110.

As illustrated in FIG. 10c, the end portion 160 of the second inner fitting 144 is butt welded to the inner tubing length 140 at the location 152. Next, as illustrated in FIG. 10d, the second outer tubing length 104 is butt welded to the end portion 210 of the second outer fitting 110 at a location 126.

As shown in FIG. 10e, the male and female couplers 130, 132, the sleeve 106, and the first outer tubing length 104 are next placed over the inner tubing length 140 and slid toward the second outer fitting 110 to expose the unwelded end of the inner tubing 140. Thereafter, the exposed end portion 160 of the first inner fitting 142 is butt welded to the inner tubing 140 at the location 150.

Next, as shown in FIG. 10f, the second length of outer tubing 102 is welded to the end portion 210 of the second outer fitting 110 at the location 124. Thereafter, as shown in FIG. 10g, the assembly of the first coaxial tubing section 100 is completed by positioning the sleeve 106 in the center of the section 100 to partially enclose the first and second outer tubing lengths 102, 104, and then welding the outer tubing lengths 102, 104 to the sleeve 106 at the locations 120 and 122. Sufficient force is applied to the two outer tubing lengths 102, 104 during the welding operation so that the outer fittings 108, 110 are forced against the facing surfaces 172 of the respective inner fittings 142, 144. Thus, when pressure is applied to the coupling nuts 130, 132, the inner fittings 142, 144 are forced together to engage and crush the metallic crush gasket 230.

The welds of the inner and outer tubing lengths at the locations 120, 122, 124, 126, 150, and 152, are performed in a factory setting, leaving only the interconnection of the couplers 130, 132 to be performed at the job site. Thus, any residue from the welding operation can be removed in the factory. As explained above, the interconnection of the couplers 130, 132 is a relatively uncomplicated operation, requiring only that the elastomeric seal 244 and the metallic gasket 230 be positioned on the fittings, the fittings aligned, and the male and female couplers 132, 130 threaded together. As the couplers 132, 130 are threadedly engaged, the inner and outer fittings are drawn together, providing fluid-tight contact between both the inner and outer fittings in one simple operation.

The present invention further provides a zero-clearance coupling which facilitates the repair and/or replacement of individual tubing sections in a system. With reference to FIG. 2, section 100 can be disconnected from sections 100' and 100" by disengaging the male couplers 132, 132" from the female couplers 130, 130' and then moving the section 100 vertically relative to the other sections 100', 100". Disengagement of the couplers 130, 130', 132, 132" requires little horizontal movement, and thus, section 100 can be removed without substantial displacement of sections 100' or 100". When the couplers 130, 130', 132, 132" have been disengaged, they are pushed or slid away from their respective outer fittings 108, 108', 110, 110" on the ends of the sections 100, 100', 100" and moved along the outer tubing sections 102, 102', 104, 104" toward the sleeves 106, and 106', 106" (not shown). The section 100 is then moved vertically to bring the outer fittings 108, 110 out of contact with the outer fittings 108', 110" on the adjacent sections 100', 100". Thus, section 100 can be repaired and/or replaced without substantial disconnection or disassembly of tubing sections 100' or 100".

FIG. 11 and FIG. 12 illustrate an embodiment of an outer fitting 300 which can be used as an alternative to the first outer fitting 108 (FIG. 3) if more flow of the purge gas is desired through the outside tubing. The outer fitting 300 comprises a first end portion 302 having an inner bore 304. A second end portion 306 is disposed opposite the first end portion 302 and includes a facing surface 308. In addition, the second end portion 306 includes a recessed facing surface 310 which surrounds the inner bore 304. Three evenly spaced raised bars 312, 314, 316 are formed approximately 120 degrees apart on the inside wall of the recessed facing portion 310 within the inner bore 304. The raised bars 312, 314, 316 form a plurality of channels 318 within the inner bore 304 which provide fluid interconnections between the first and second end portions 302, 306 of the fitting 300 and allow for increased flow between coupled outer tubing sections. The ends of the bars 312, 314, 316 form a three-section facing surface 320 that forces against the facing surface 172 of the inner fittings 142, 144. The recessed facing surface 310 applies pressure against the elastomeric seal 244 in a like manner as the previously described embodiment. A corresponding second outside fitting (not shown) is constructed in a similar manner to provide the enlarged channels in the inner bore. Preferably, the second outside fitting has a flush facing surface that compresses the elastomeric seal 244 when the two fittings are forced together by the couplers 130, 132.

A further alternative embodiment of the invention is illustrated in FIGS. 13, 14, and 15. In this embodiment, two identical first and second outer fittings 350, 352 are formed. Each fitting 350, 352 comprises a first end portion 354 having an inner bore 356. A second end portion 358 is disposed opposite the first end portion 354 and includes a flush facing surface 360. A shoulder 362 is formed intermediate the first and second end portions 354, 358. An annular groove 364 is formed intermediate the shoulder 362 and the flush facing surface 360. Each fitting 350, 352 further includes a recessed facing surface 366 formed within the flush facing surface 360 which surrounds the inner bore 356. A first pair of longitudinal grooves 370 are formed in the second end portion 358 intermediate the recessed facing surface 366 and the flush facing surface 360. A pair of radial grooves 372 are formed on the recessed facing surface 366. A second pair of longitudinal grooves 374 are formed within the wall surrounding the inner bore 356. The radial and longitudinal grooves 370, 372, 374 provide fluid interconnections between the first and second end portions 354, 358 of each fitting 350, 352.

FIGS. 14 and 15 illustrate the interconnection of the fittings from two tubing sections. It should be understood that the female coupler and associated fittings described below are from a first tubing section and that the male coupler and associated fittings are from a second tubing section. As in the previously illustrated embodiments, the previously described first and second inner fittings 142, 144 fit within the inner bores 356 of the first and second outer fittings 350, 352 as shown in FIG. 14 and engage the recessed facing surfaces 366.

A female coupler 380 has a plurality of internal threads 382 formed in a central cavity. The female coupler 380 is positioned over the first outer fitting 350. The female coupler 380 further comprises a facing surface 384 disposed at the end portion of the coupler 380 opposite the internal threads 382. The central cavity includes a tapered wall 386 intermediate the internal threads 382 and the facing surface 384. The tapered wall 386 has a first diameter adjacent the internal threads 382 and tapers to a second smaller diameter adjacent the facing surface 384.

A male coupler 390 is positioned over a second outer fitting 352. The male coupler 390 has a plurality of external threads 392 and includes a facing surface 394 adjacent the external threads 392.

A pair of elastomeric seals 398 are positioned within the annular grooves 364 on the first and second outer fittings 350, 352. A metallic gasket 230, which may be identical to that shown in FIG. 1, is positioned on the raised circular ridge 168 of the second inner fitting 144 and retained in place by the retainer ring 232. When the male coupler 390 is threadedly engaged with the female coupler 380, the outer fittings 350, 352 are forced together, thus forcing the inner fittings 142, 144 together as well. As the fittings are forced together, the elastomeric seals 398 are compressed between the outer fittings 350, 352 and tapered wall 386 of the female coupler 380, effectively sealing the passages formed by the longitudinal grooves 370, 372, 374 in the outer fittings 350, 352. Further movement of the fittings 350, 352 toward one another forces the metallic gasket 230 into contact with the ridges 168 of the first and second inner fittings 142, 144, thus sealing the inner passageway for the toxic gas, as the elastomeric seals 398 are further compressed. Thus, the elastomeric seals 398 form a seal before and after the metallic gasket 230 makes contact with the inner fittings 142, 144 and forms the seal between the inner fittings. In this manner, the fluid-tight seals between the fittings are accomplished in one simple operation.

FIG. 16 illustrates a 90-degree, or "elbow", coupling 400 in accordance with the present invention. The elbow is advantageously constructed using the inner and outer fittings and the couplers described above for the first embodiment of the invention and are numbered correspondingly.

The coupling 400 includes a cubical sleeve 402 having six faces. A first outer tubing section 404 is welded to a first face 406 of the sleeve 402 and a second outer tubing section 408 is welded to a second face 410 of the sleeve 402. The second face 410 is at a 90-degree angle with respect to the first face 406.

The first outer tubing section 404 is welded to the first outer fitting 108, and the second outer tubing section 408 is welded to the second outer fitting 110. The female coupler 130 is positioned on the first outer fitting 108, and the male coupler 132 is positioned on the second outer fitting 110. The elbow fitting 400 can be interchangeably interconnected to the above-described tubing length 100 to provide 90-degree turns in the gas flow passageways.

FIG. 17 through FIG. 24 illustrate the assembly process for constructing the right angle coupling 400 of FIG. 16. The male end of the coupler 400 is assembled first in the embodiment described. The passageway for toxic gases is provided by the inner fittings 142, 144, first and second inner tubing sections 420, 422, and an inner elbow 424. As shown in FIG. 18, the inner elbow 424 comprises a cubical housing 432 having a pair of intersecting bores formed therein to provide a passageway. First and second cylindrical tubes 434, 436 project at right angles from the housing 432 and extend the passageways formed by the intersecting bores. The first and second tubes 434, 436 have outside diameters approximately equal to the diameters of the first and second inner tubing sections 420, 422.

As shown in FIG. 17, the second inner tubing section 422 is butt welded to the second inner fitting 144 at a location 440. Thereafter, the second outer fitting 110 is slipped over the second inner fitting 144.

Referring to FIG. 19 and FIG. 20, the second inner tubing section 422 is butt welded to the second cylindrical tube 436 at a location 442. The second outer tubing section 408 is positioned over the inner elbow 424, the second inner tubing section 422 and over the first end portion 210 of the second outer fitting 110. The second outer tubing section 408 is welded to the first end portion 210 adjacent the shoulder 220 of the second outer fitting 110 at a location 444. The male coupler 132 is then slid over the inner elbow 424, the second outer tubing section 408, and the second outer fitting 110 such that the second outer fitting 110 and the second outer tubing section 408 are disposed within the central cavity of the coupler 132. The facing surface 136 of the male coupler 132 is in contact with the shoulder 220 on the second outer fitting 110.

The cubical sleeve 402 is shown in more detail in FIG. 21. The first face 406 and the second face 410 of the sleeve 402 are disposed at right angles to each other and are formed with first and second circular apertures 450 and 452 into an inner cavity 454. The first and second apertures 450, 452 have diameters which are substantially equal to the diameters of the first and second outer tubing sections 404, 408.

As illustrated in FIG. 22 and 23, the sleeve 402 is positioned over the inner elbow 424 such that the inner elbow 424 extends through the second circular aperture 452 and is enclosed within the cavity 454. The first inner fitting 142 is welded to the first inner tubing section 420 at a location 456 and then positioned within the first outer fitting 108. The first outer tubing section 404 is positioned on the first outer fitting 108, and the female coupler 130 is positioned over the first outer tubing section 404 and first outer fitting 108.

Next, the inner elbow 424 is positioned within the cubical sleeve 402 such that a portion of the first cylindrical tube 434 extends through the first cylindrical aperture 450 as shown in FIG. 23. The first outer tubing section 404, the first outer fitting 108, and the female coupler 130 are positioned away from the first inner tubing section 420, as illustrated. The first inner tubing section 420 can then be butt welded to the first cylindrical tube 434 of the inner elbow 424 at a location 460, thus providing a continuous passage between the first and second inner tubing sections 420, 422 via the inner elbow 424.

Once the first inner tubing section 420 has been welded to the inner elbow 424, the inner elbow 424 is centered within the cubical sleeve 402 such that the inner tubing sections 420, 422 extend through the center of the circular apertures 450, 452. The outer tubing sections 404, 408 are then welded to the adjacent faces 406, 410 of the cubical sleeve 402 at respective locations 462 and 464. In addition, the first outer tubing section 404 is welded to the first end portion 180 of the first outer fitting 108 at a location 466. The male and female couplers 130, 132 are positioned such that the facing surface of each coupler is in contact with the shoulder of the respective outer fitting on which it rests. The welds at the locations 440, 442, 444, 456, 460, 462, 464 and 466 can all be performed prior to installation in a factory setting. The coupling is thus ready to be interconnected to a section of coaxial tubing, such as section 100' or 100" (FIG. 2), by simply threading the male and female couplers 130, 132 with corresponding, or mating, couplers.

Various embodiments of the present invention have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A connector system for interconnecting first and second coaxial pipes having respective inner and outer tubes, said first connector system comprising:
   first and second inner fittings attached to said inner tubes of said first and second coaxial pipes, respectively, each of said first and second inner fittings having a facing surface with a circular ridge formed thereon and having a shoulder proximate to said facing surface;
   first and second outer fittings attached to said outer tubes of said first and second coaxial pipes, respectively, each of said first and second outer fittings having a facing surface and having an annular recess formed in said facing surface, said annular recess being sized to receive said shoulder to a respective one of said first and second inner fittings, each of said first and second outer fittings having a shoulder disposed opposite said facing surface;
   a first coupler to fit over said first outer fitting, said first coupler having a facing surface that engages with said shoulder of said first outer fitting, said first coupler having external threads on a portion thereof;
   a second coupler sized to fit over said second outer fitting, with second coupler having a facing surface that engages with said shoulder of said second outer fitting, said second coupler having internal threads to engage said external threads of said first coupler;
   a metallic gasket positioned between said circular ridge on said facing surface of said first inner fitting and said circular ridge on said facing surface of said second inner fitting; and
   a pliable seal positioned between said facing surface of said first outer fitting and said facing surface of said second outer fitting, said pliable seal having a diameter sufficient to encompass said annular recesses in said facing surfaces of said first and second outer fittings, said pliable seal having a thickness selected so that said pliable seal starts compressing when said first and second couplers are threadingly engaged prior to engagement of said metallic gasket by said circular ridges and continues to compress after engagement of said metallic gasket by said circular ridges so that said metallic gasket provides fluid-tight contact with said circular ridges and said pliable seal provides fluid-tight contact between said first and second outer fittings.

2. The connector system as defined in claim 1, wherein said metallic gasket is mounted on said circular ridge on said first inner fitting.

3. The connector system as defined in claim 1, wherein said first outer fitting further includes a recessed facing surface surrounding said annular recess.

4. The connector system as defined in claim 3, wherein said elastomeric seal is positioned between said facing surface of said first outer fitting and said facing surface of said second outer fitting.

5. A connector system for interconnecting first and second coaxial pipes having respective inner and outer tubes, said connector system comprising:
   first and second inner fittings attached to said inner tubes of said first and second coaxial pipes, respectively, each of said first and second inner fittings having a facing surface with a circular ridge formed thereon and having a shoulder proximate to said facing surface;
   first and second outer fittings attached to said outer tubes of said first and second coaxial pipes, respectively, each of said first and second outer fittings having a facing surface and having an annular recess formed in said facing surface, said annular recess being sized to receive said shoulder of a respective one of said first and second inner fittings, each of said first and second outer fittings having a shoulder disposed opposite said facing surface, wherein said first and second outer fittings further comprise a plurality of apertures formed in said annular recess, said apertures providing fluid interconnections between said outer fittings and said outer tubes;
   a first coupler sized to fit over said first outer fitting, said first coupler having a facing surface that engages with said shoulder of said first outer fitting, said first coupler having external threads on a portion thereof;
   a second coupler sized to fit over said second outer fitting, said second coupler having a facing surface that engages with said shoulder of said second outer fitting, said second coupler having internal threads to engage said external threads of said first coupler;
   a metallic gasket positioned between said circular ridge on said facing surface of said first inner fitting and said circular ridge on said facing surface of said second inner fitting; and a pliable seal positioned between said facing surface of said first outer fitting and said facing surface of said second outer fitting, said pliable seal having a diameter sufficient to encompass said annular recesses in said facing surfaces of said first and second outer fittings, said pliable seal having a thickness selected so that said pliable seal starts compressing when said first and second couplers are threadingly engaged so that said metallic gasket provides fluid-tight contact with said circular ridges and said pliable seal provides fluid-tight contact between said first and second outer fittings.

6. A connector system for interconnecting first and second coaxial pipes having respective inner and outer tubes, said connector system comprising:

first and second inner fittings attached to said inner tubes of said first and second coaxial pipes, respectively, each of said first and second inner fittings having a facing surface with a circular ridge formed thereon;

first and second outer fittings attached to said outer tubes of said first and second coaxial pipes, respectively, said first and second outer fittings surrounding said first and second inner fittings, respectively;

a first coupler sized to fit over said first outer fitting, and a second coupler sized to fit over said second outer fitting, said first and second coupler having mating threads for mutual engagement of said first and second couplers so that said first and second couplers can be forced toward each other;

a flat metallic gasket having opposing surfaces, said flat metallic gasket positioned between said circular ridge on said facing surface of said first inner fitting and said circular ridge on said facing surface of said second inner fitting so that said circular ridges engage said opposing surfaces of said flat metallic gasket when said first and second couplers are forced toward each other; and at least one pliable seal positioned with respect to said first and second outer fittings to compress and form a sealed passageway between said first and second outer fittings when said first and second couplers are forced toward each other, said pliable seal having a thickness selected to complete said sealed passageway prior to engagement of said circular ridges with said flat metallic gasket, said pliable seal having sufficient elasticity to continue compressing until said first and second circular ridges are completely engaged with said flat metallic gasket.

7. The connector system as defined in claim 6, wherein said pliable seal is positioned between said first and second outer fittings.

8. The connector system as defined in claim 6, comprising two pliable seals, wherein said first and second outer fittings each includes an annular groove that receives one of said pliable seals.

9. A connector system for interconnecting first and second coaxial pipes having respective inner and outer tubes, said connector system comprising:

first and second inner fittings attached to said inner tubes of said first and second coaxial pipes, respectively, each of said first and second inner fittings having a facing surface with a circular ridge formed thereon;

first and second outer fittings attached to said outer tubes of said first and second coaxial pipes, respectively, said first and second outer fittings surrounding said first and second inner fittings, respectively;

two pliable seals, wherein said first and second outer fittings each includes an annular groove that receives one of said pliable seals;

a first coupler sized to fit over said first outer fitting, and a second coupler sized to fit over said second outer fitting, said first and second coupler having mating threads for mutual engagement of said first and second couplers so that said first and second couplers can be forced toward each other, wherein said second coupler comprises a tapered inside wall, and wherein said two pliable seals are compressed between said first and second outer fittings and said tapered inside wall;

a flat metallic gasket having opposing surfaces, said flat metallic gasket positioned between said circular ridge on said facing surface of said first inner fitting and said circular ridge on said facing surface of said second inner fitting so that said circular ridges engage said opposing surfaces of said flat metallic gasket when said first and second couplers are forced toward each other; and at least one pliable seal positioned with respect to said first and second outer fittings to compress and form a sealed passageway between said first and second outer fittings when said first and second couplers are forced toward each other, said pliable seal sized to complete said sealed passageway prior to engagement of said circular ridges with said flat metallic gasket, said pliable seal having sufficient elasticity to continue compressing until said first and second circular ridges are completely engaged with said flat metallic gasket.

10. A connector system for interconnecting first and second coaxial pipes having respective inner and outer tubes, said connector system comprising:

first and second inner fittings attached to said inner tubes of said first and second coaxial pipes, respectively, each of said first and second inner fittings having a facing surface with a circular ridge formed thereon;

first and second outer fittings attached to said outer tubes of said first and second coaxial pipes, respectively, said first and second outer fittings surrounding said first and second inner fittings, respectively, wherein each of said first and second outer fittings includes a plurality of raised columns forming a plurality of channels within said inner bore providing fluid interconnections between said outer fittings and said outer tubes;

a first coupler sized to fit over said first outer fitting, and a second coupler sized to fit over said second outer fitting, said first and second coupler having mating threads for mutual engagement of said first and second couplers so that said first and second couplers can be forced toward each other;

a flat metallic gasket having opposing surfaces, said flat metallic gasket positioned between said circular ridge on said facing surface of said first inner fitting and said circular ridge on said facing surface of said second inner fitting so that said circular ridges engage said opposing surfaces of said flat metallic gasket when said first and second couplers are forced toward each other; and at least one pliable seal positioned with respect to said first and second outer fittings to compress and form a sealed passageway between said first and second outer fittings when said first and second couplers are forced toward each other, said pliable seal sized to complete said sealed passageway prior to engagement of said circular ridges with said flat metallic gasket, said pliable seal having sufficient elasticity to continue compressing until said first and second circular ridges are completely engaged with said flat metallic gasket.

11. A connector system for interconnecting first and second coaxial pipes having respective inner and outer tubes, said connector system comprising:

first and second inner fittings attached to said inner tubes of said first and second coaxial pipes, respectively, each of said first and second inner fittings having a facing surface with a circular ridge formed thereon;

first and second outer fittings attached to said outer tubes of said first and second coaxial pipes, respectively, said first and second outer fittings surrounding said first and second inner fittings, respectively, wherein said inner tube and said outer tube of one of said first and second coaxial pipes each comprises a respective first section and a respective second section, said first sections being positioned at an angle with resect to said second sections, and wherein said first and second sections of said outer tube are interconnected by a sleeve;

a first coupler sized to fit over said first outer fitting, and a second coupler sized to fit over said second outer fitting, said first and second coupler having mating threads for mutual engagement of said first and second couplers so that said first and second couplers can be forced toward each other;

a flat metallic gasket having opposing surfaces, said flat metallic gasket positioned between said circular ridge on said facing surface of said first inner fitting and said circular ridge on said facing surface of said second inner fitting so that said circular ridges engage said opposing surfaces of said flat metallic gasket when said first and second couplers are forced toward each other; and at least one pliable seal positioned with respect to said first and second outer fittings to compress and form a sealed passageway between said first and second outer fittings when said first and second couplers are forced toward each other, said pliable seal sized to complete said sealed passageway prior to engagement of said circular ridges with said flat metallic gasket, said pliable seal having sufficient elasticity to continue compressing until said first and second circular ridges are completely engaged with said flat metallic gasket.

12. A connector system for interconnecting first and second coaxial pipes having respective inner and outer tubes, said connector system comprising:

first and second inner fittings attached to each end of said inner tube of said first pipe, each of said first and second inner fittings having a facing surface with a circular ridge formed thereon and having a shoulder proximate to said facing surface;

first and second outer fittings to each end of said outer tube of said first pipe, each of said first and second outer fittings having a facing surface and having a recess formed in said facing surface, said recess being sized to receive said shoulder of a respective one of said first and second inner fittings, each of said first and second outer fittings having a shoulder disposed opposite said facing surface;

a first coupler sized to fit over said first outer fitting, said coupler having a facing surface that engages with said shoulder of said first outer fitting, said first coupler having external threads on a portion thereof;

a second coupler sized to fit over said second outer fitting, said second coupler having a facing surface that engages with said shoulder of said second outer fitting, said second coupler having internal threads on a portion thereof;

a metallic gasket positioned on said circular ridge on said facing surface of one of said first inner fitting and said second inner fitting; and an elastomeric seal positioned on said facing surface of said first outer fitting and around said recess, said elastomeric seal having a diameter sufficient to encompass said recess in said facing surface of said first outer fitting, said elastomeric seal having an uncompressed thickness sufficient so that said elastomeric seal extends a distance beyond said circular ridge on said first inner fitting, said distance greater than said thickness of said metallic gasket plus the height of said circular ridge on said second inner fitting so that when said first and second couplers are threadingly engaged, said elastomeric seal is compressed between said facing surface of said first outer fitting and said facing surface of said second outer fitting before said metallic gasket is fully engaged by said circular ridges on said facing surfaces of said first and second inner fittings and further compresses until said metallic gasket is fully engaged by said circular ridges.

13. A connector system for interconnecting first and second coaxial pipes having respective inner and outer tubes, said connector system comprising:

first and second connectors attached to said first and second coaxial pipes, respectively, each of said first and second connectors having an inner passageway and an outer passageway, wherein said inner passageway of each connector has an inside diameter substantially equal to the inside diameter of said inner tube and wherein said outer passageway of each connector opens into said outer tube, each of said connectors having a facing surface with a circular ridge formed thereon;

a first coupler sized to fit over said first connector, and a second coupler sized to fit over said second connector, said first and second couplers having mating threads for mutual engagement of said first and second couplers so that said first and second couplers can be forced toward each other;

a flat metallic gasket having opposing surfaces, said flat metallic gasket positioned between said circular ridge on said facing surface of said first connector and said circular ridge on said facing surface of said second connector so that said circular ridges engage said opposing surfaces of said flat metallic gasket when said first and second couplers are forced toward each other; and at least one pliable seal positioned with respect to said first and second connectors when said first and second couplers are forced toward each other, said pliable seal having a thickness selected to complete said sealed passageway prior to engagement of said circular ridges with said flat metallic gasket, said pliable seal having sufficient elasticity to continue compressing until said first and second circular ridges are completely engaged with said flat metallic gasket.

* * * * *

UNITED STATES PATENT AND TRADEMARK OFFICE
CERTIFICATE OF CORRECTION

PATENT NO. : 5,088,774
DATED : February 18, 1992
INVENTOR(S) : Spiegelman

It is certified that error appears in the above-indentified patent and that said Letters Patent is hereby corrected as shown below:

Column 11, line 41, delete "first".

Column 11, line 53, after "shoulder", change "to" --of--.

Signed and Sealed this

Seventeenth Day of August, 1993

Attest:

BRUCE LEHMAN

Attesting Officer

Commissioner of Patents and Trademarks